Dec. 3, 1968 E. O. EKBERGH ET AL 3,414,681

SPEECH CONTACT NETWORK IN A TELEPHONE SYSTEM

Filed Sept. 24, 1965 2 Sheets-Sheet 1

Dec. 3, 1968 E. O. EKBERGH ET AL 3,414,681

SPEECH CONTACT NETWORK IN A TELEPHONE SYSTEM

Filed Sept. 24, 1965 2 Sheets-Sheet 2

United States Patent Office 3,414,681
Patented Dec. 3, 1968

3,414,681
SPEECH CONTACT NETWORK IN A TELEPHONE SYSTEM

Evert O. Ekbergh, Hagersten, and Per G. Jonsson, Ronninge, Sweden, assignors to International Standard Electric Corporation Filed Sept. 24, 1965, Ser. No. 489,977
Claims priority, application Sweden, Oct. 9, 1964, 12,590/64
5 Claims. (Cl. 179—18)

ABSTRACT OF THE DISCLOSURE

Apparatus is provided in a switching network including a register and marker whereby calls are established through a common subscriber multiple connecting both a plurality of subscribers and trunks and wherein line links are included as intermediate link connections in the link selector stage. The links which are utilized in the common multiple have interchangeable input and output sides.

Figure 1:
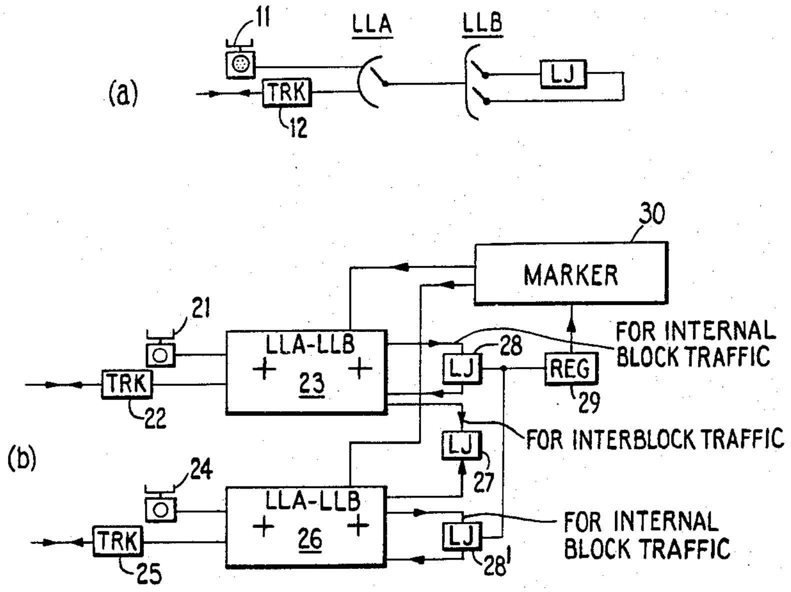

This invention refers in general to telephone switching systems and in particular refers to speech contact networks such as disclosed in our copending application entitled, "Speech Contact Networks," Ser. No. 446,011, filed on Apr. 6, 1965 and assigned to the assignee of this invention. The inventive networks enable different categories of calls, such as local calls, trunk calls and transit calls, to be established over a minimum number of contacts. In accordance with the above-mentioned patent application, the speech contact networks are built in subscriber blocks provided with multiples common to said subscribers to minimize the number of contacts.

An object of this invention is to further minimize the number of crosspoints or contacts required to interconnect calling and called equipment without limiting service or adversely effecting traffic.

A further object of this invention is to provide common primary selectors common to subscribers, trunks and registers. The primary selectors are interconnected to secondary selectors.

In accordance with the instant invention calls are established through a common subscriber multiple or a common multiple contact panel, to which both subscribers and trunks are connected, wherein a connection first is made to a register over a free local link in said contact panel concurrently with the position of the calling subscriber in the subscriber multiple being registered in the register. After the desired number has been registered and the positions of the subscriber parties have been transferred to the marker the connection over that line link, to which a register has been connected, is released, whereafter the marker selects an appropriate connecting path between the subscriber parties, so called resetting. In this manner, the advantage is gained that all of the selectors between the subscriber parties are utilized as a unitary link selector stage.

The switching network can preferably be designed in such manner that the line links are included as intermediate link connections in said link selector stage. It is possible to utilize the links in the common switching panel more effectively by providing the links with interchangeable input and output sides.

The link in the switching panel can comprise line links provided with current supply means or line links in which when necessary, metallic through connections can be made.

The speech contact network can also be used in such manner that all of the registers are connected in the subscriber multiple in the same way as trunks, whereby unlimited accessibility to all registers will be attained.

The sub-selector stages can be provided with individual selectors, with primary selectors being utilized for connecting subscribers, trunks and registers, and secondary selectors being utilized for connecting the primary selectors. The inputs to the secondary stage thereby form the common multiple to which the line links are connected.

The speech contact network can also be designed for connecting trunks directly to the inputs of the secondary selectors in place of line links or to the multiple of the secondary selectors.

Figure 2:
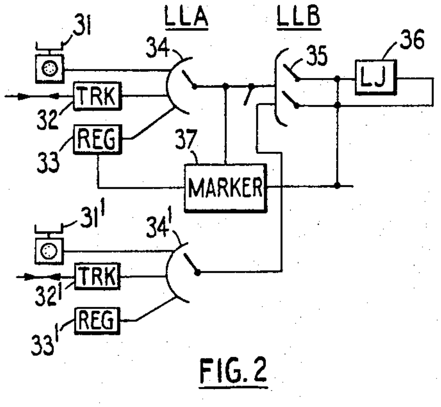
Figure 3:
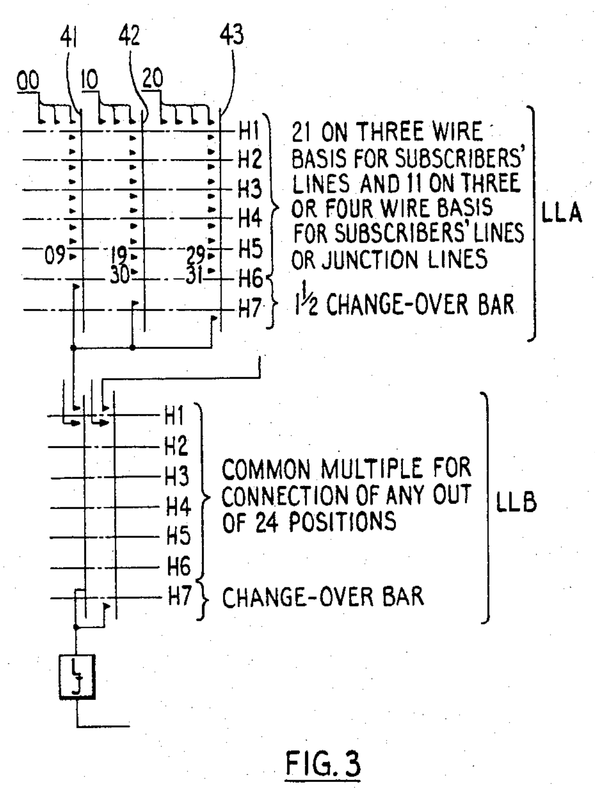

These and other objects, advantages and features of this invention and the manner of obtaining them will become more apparent, and the invention itself will be best understood by reference to the following description of an embodiment of the invention taken in conjunction with the accompanying drawings in which:

FIGS. 1*a* and 1*b* illustrate the principle of establishing calls through the common multiple;

FIG. 2 illustrates the registers connected in the subscriber multiple in the same manner as trunks; and FIG. 3 illustrates secondary selectors utilized for connecting the primary selectors.

FIG. 1*a* shows in a broad fashion, an emobdiment of the inventive system. As shown therein subscriber stations and trunk circuits, such as station 11 and trunk 12, are connected to certain of the inputs of the primary stage of a local link represented by rotary switch LLA. A plurality of primary stages are interconnted through secondary stages such as LLB. A line link such as line link LJ is used to connect the secondary link LLB shown through a primary link, to a subscriber or trunk, not shown. It should be understood that while only one of each component part is disclosed the inventive system contemplates the interconnection of pluralities of such component parts.

FIG. 1*b*, for example, shows twice as many component parts as is shown in FIG. 1*a*. Here again, the showing is merely representative of the interconnection of a plurality of parts. For example, subscriber station 21 and trunk 22 are shown permanently connected to the common multiple 23 comprised of the primary and secondary stages of a local link. In a similar manner, subscriber station 24 and trunk 25 are permanently connected to the common multiple 26 comprised of primary and secondary selector stages similar to those of the common multiple described in the above identified copending patent application. Common multiples 23, 26 are interconnected by line link 27. Line links 28, 28' are used where it is possible to interconnect subscribers and trunks on multiples 23 and 26 respectively. Register 29 is connected to the multiple through links 28, 28'. A marker 30 is connected to receive information from the register 29 and use the information to control the switching on multiples 23, 26.

FIG. 2 depicts the embodiment of the invention wherein a register is connected directly to the input of the primary selector of the common multiple in the same manner as the subscriber stations and the trunks. Thus, FIG. 2 shows subscriber station 31, trunk 32 and register 33 connected to the inputs of selector 34 of primary stage LLA. The output of selector 34 is connected to many secondary selectors, one of which is selector 35 of secondary stage LLB. The call is connected through a line link 36 and the secondary selector, another primary selector 34' to a register 33'. The register is connected to a marker 37 used to control the setting of the switches.

FIG. 3 symbolically shows a portion of the common multiple. More specifically, as depicted, the common multiple is a crossbar switch having at least fourteen horizontal levels shown as the upper horizontals H1–H7 and the lower horizontals H1–H7. The verticals are split as shown. The top of the split verticals 41–43 are used for selecting subscriber lines, trunks or registers while the bottom of split verticals 44, 45 are used to select top verticals on this and other multiple and to connect the selected vertical to line links such as LJ.

In operation if a calling subscriber such as the subscriber at subscriber station 21 initiates a call, register 29 is seized and connected to station 21 through the primary and secondary stages of multiple 23 and line link 28. The register receives the dial signals and transmits them or translated equivalents of the dial signals to marker 30. The register drops out and the marker resets the switches 23 and 26 to connect subscriber station 21 to a called station such as station 24 or an outgoing trunk such as trunk 25.

It should be understood that where traffic conditions require it, access circuits can be provided within the inventive concept. Also as shown in FIG. 2 the registers can be connected to the inputs to the common multiples in the same manner as the trunks.

While the principles of the invention has been described above in connection with specific apparatus and applications, it is to be understood that this description is made only by way of example and not as a limitation on the scope of the invention.

We claim:

1. A switching contact network for interconnecting a plurality of subscriber stations and trunks, said network comprising multiple means common to groups of said stations and trunks, said common multiples divided into primary and secondary stages with said stations and trunks connected to the said primary stages, means including said secondary stages for interconnecting said primary stages, register means for receiving routing information from calling ones of said subscriber stations, line link means in said multiple for connecting said calling station to said register means, said line links including interchangeable input and output sides whereby the links in the common multiple can be utilized to a greater extent, and marker means operated responsive to signals received from said register means for resetting said common multiple to connect said calling station to a called one of said stations.

2. A speech contact network in accordance with claim 1, wherein the links in the contact panel comprise line links provided with current supply means.

3. A speech contact network in accordance with claim 2, wherein the links in the common multiple comprise means for adapting said link means to be metallically through-connected when necessary.

4. A speech contact network in accordance with claim 1, wherein means are provided for connecting said register means to the primary stages of the common multiple means whereby unlimited accessibility to all registers is attained.

5. A speech contact network in accordance with claim 1, wherein the stages of said common multiple are provided with individual selectors, said selectors associated with said primary stage being utilized for connecting the subscribers, trunks and registers, and said selectors associated with said secondary stage being adapted to connect the primary selectors and the means for connecting said line links to the secondary selectors.

References Cited

UNITED STATES PATENTS

| | | | |
|---|---|---|---|
| 3,308,242 | 3/1967 | Erwin | 179—22 |
| 2,999,131 | 5/1961 | Edstrom | 179—18.7 |

KATHLEEN H. CLAFFY, *Primary Examiner.*

LAWRENCE A. WRIGHT, *Assistant Examiner.*